(12) United States Patent
Toshimoto

(10) Patent No.: US 6,339,637 B1
(45) Date of Patent: Jan. 15, 2002

(54) ANSWERING SYSTEM (75) Inventor: Michitaka Toshimoto, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/022,627

(22) Filed: Feb. 12, 1998

(30) Foreign Application Priority Data

Mar. 17, 1997 (JP) .............................................. 9-062737

(51) Int. Cl.[7] .................................................. H04M 1/64
(52) U.S. Cl. .................................. 379/88.22; 379/88.23
(58) Field of Search ...................... 379/67.1, 69, 88.12, 379/88.19, 88.22, 88.23, 88.24, 90.01, 201.01; 455/412, 413

(56) References Cited

U.S. PATENT DOCUMENTS

| | | | | |
|---|---|---|---|---|
| 4,506,111 A | * | 3/1985 | Takenouchi et al. | |
| 5,353,259 A | * | 10/1994 | Howes et al. | 379/89 |
| 5,392,336 A | * | 2/1995 | Chang et al. | 379/93 |
| 5,481,597 A | * | 1/1996 | Given | 379/67 |
| 5,787,151 A | * | 7/1998 | Nakatsu et al. | 379/67 |
| 5,790,790 A | * | 8/1998 | Smith et al. | 395/200.36 |
| 5,943,417 A | * | 8/1999 | Cox et al. | 379/266 |

FOREIGN PATENT DOCUMENTS

| | | |
|---|---|---|
| JP | 56141/1993 | 3/1993 |
| JP | 63791/1993 | 3/1993 |
| JP | 199292/1993 | 8/1993 |

* cited by examiner

Primary Examiner—Scott L. Weaver
(74) Attorney, Agent, or Firm—Nixon & Vanderhye P.C.

(57) ABSTRACT

An answering system of the present invention, connected to a public line or a private line, is capable of recording and reproducing audio and/or visual data, and is adopted, for example, in a telephone and a mobile communication terminal. The present answering system includes confirming units for confirming whether a message sent to a receiver by the unspecified caller with an arbitrary ID has been processed by the receiver, when the unspecified caller accesses again with the arbitrary ID.

11 Claims, 3 Drawing Sheets

REGISTRATION METHOD

FIG. 3 (b)

REPRODUCING METHOD

ANSWERING SYSTEM

FIELD OF THE INVENTION

The present invention relates to an answering system capable of recording and reproducing audio and/or visual data transmitted through a public line, a private line, or other lines, which is adopted, for example, in a telephone and a mobile communication terminal having an answering function.

BACKGROUND OF THE INVENTION

Conventionally, an answering system, connected to, for example, a phone line, for recording a message from a sender (unspecified caller) in an answering machine in response to a call is widely known.

In such an answering system, an answering function is set by the owner prior to leaving, and recording is carried out automatically in response to a call from outside.

Figure 3A:
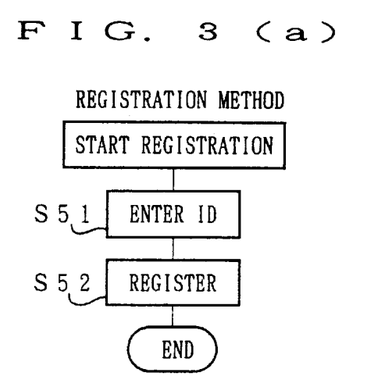
FIG. 3(a) and FIG. 3(b) are flowcharts respectively showing an operation of a conventional answering system.
Figure 3B:
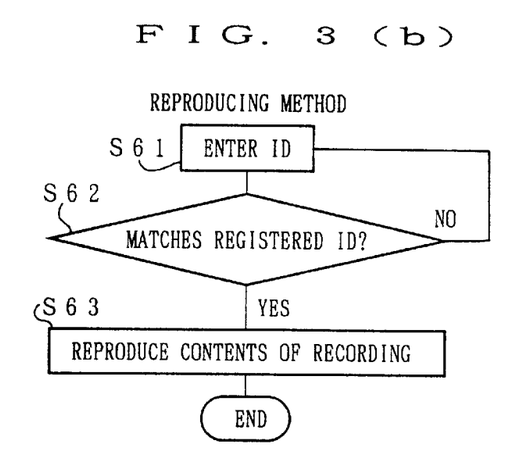

The contents of a recording can be reproduced by the owner of the answering system from a remote location by using an identification code (hereinafter referred to as ID) which has been registered beforehand. The owner of the answering system registers a specific ID beforehand by the registration method shown in FIG. 3 (a), and reproduces the contents of the recording by the reproducing method shown in FIG. 3(b). In the registration method, a specific ID is entered in Step 51, and the specific ID thus entered is registered in Step 52. In the reproducing method, the ID is entered by the owner, for example, from a remote location (Step 61), the answering system judges whether the entered ID matches the pre-registered ID (Step 62), and in the case where the entered ID matches the registered ID, the contents of the recording is reproduced (Step 63). In the case where it is judged that the entered ID does not match the registered ID, the answering system returns to a standby state (Return to Step 61).

However, the conventional answering system has such a drawback in that in the case where a call is made by an unspecified caller other than the owner, and an audio message is entered in a certain period of time in accordance with a fixed response message of the answering system, it is impossible for the unspecified caller, once the message is entered, to confirm whether the entered message has been processed by the receiver (owner). Here, by "processed", it is meant that the receiver has reacted to the entered message, such as listening to and/or seeing the message, recording a response message, and releasing an answering mode.

Namely, in the conventional answering system, an ID is registered beforehand in the answering system by the owner, and only the owner and a person knowing the ID are allowed an access to the answering system so as to allow them to confirm whether a message has been processed. Thus, it is impossible for an unspecified caller to confirm whether the entered message has been processed indeed by a receiver, and also once a message is entered, the message cannot be corrected even when a mistake has been made in entering of the message.

SUMMARY OF THE INVENTION

It is the first object of the present invention to provide an answering system which allows an unspecified person, other than an owner of the answering system, to confirm with ease whether a message as entered by the unspecified person has been processed by the owner.

It is the second object of the present invention to provide an answering system which allows an unspecified person, other than an owner of the answering system, to correct and/or erase a message as entered by the unspecified person.

In order to achieve the above-mentioned objects, the answering system of the present invention for recording and reproducing audio and/or visual data transmitted through a line or other transmitting paths includes confirming units for allowing an unspecified person to confirm, using an arbitrary identification code, whether audio and/or visual data sent by the unspecified person to a receiver with the arbitrary identification code such as an identification number have been processed by the receiver.

Thus, with the confirming units, it is possible for an unspecified person to confirm, using an arbitrary identification code, whether a message as entered by the unspecified person has been processed by the receiver (owner of the answering system, etc.). Therefore, it is possible to improve the accuracy and efficiency of information transmittance.

For a fuller understanding of the nature and advantages of the invention, reference should be made to the ensuing detailed description taken in conjunction with the accompanying drawings.

DESCRIPTION OF THE EMBODIMENTS

Figure 1:
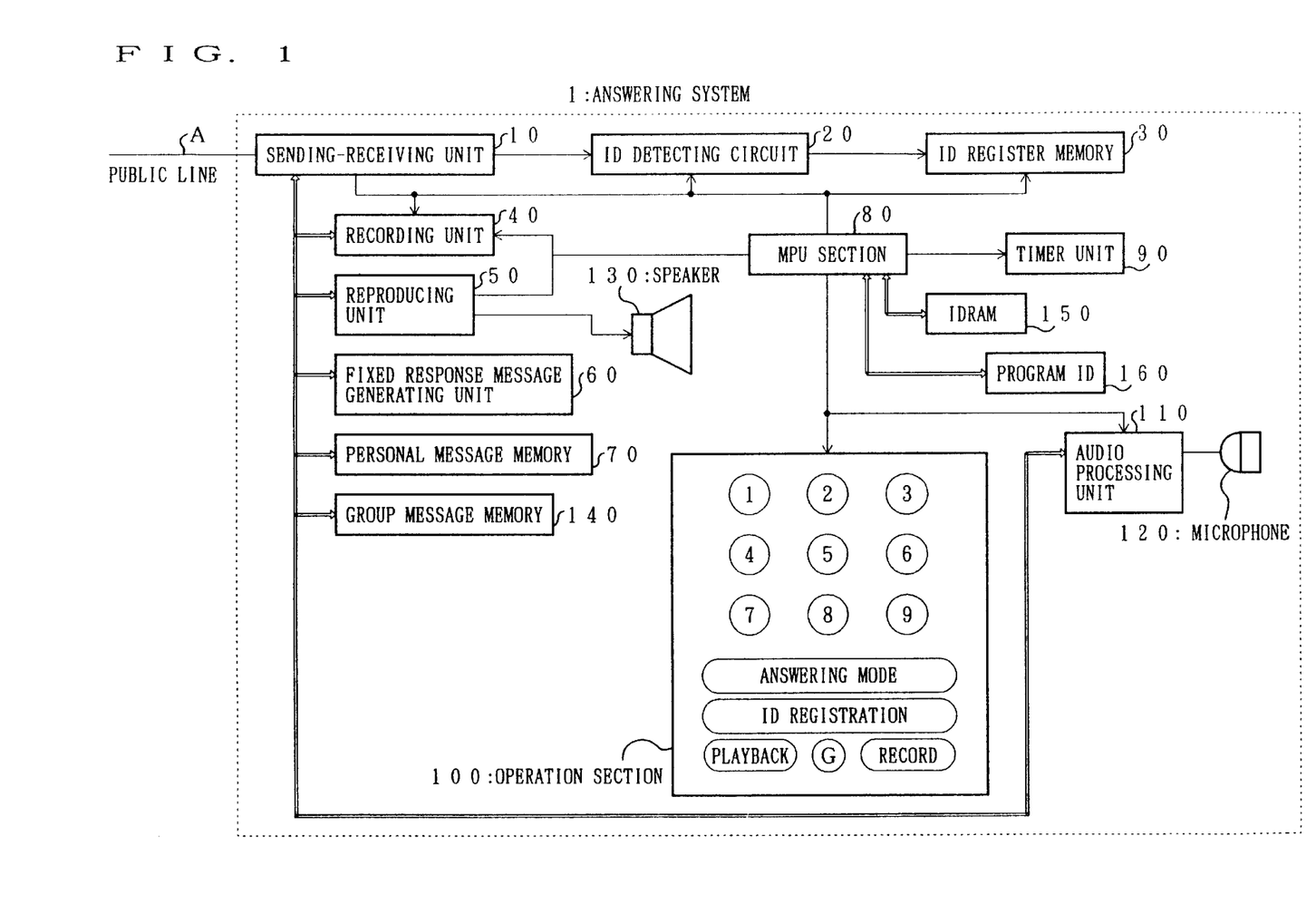
FIG. 1 is a block diagram showing a structure of an answering system in accordance with one embodiment of the present invention.
Figure 2:
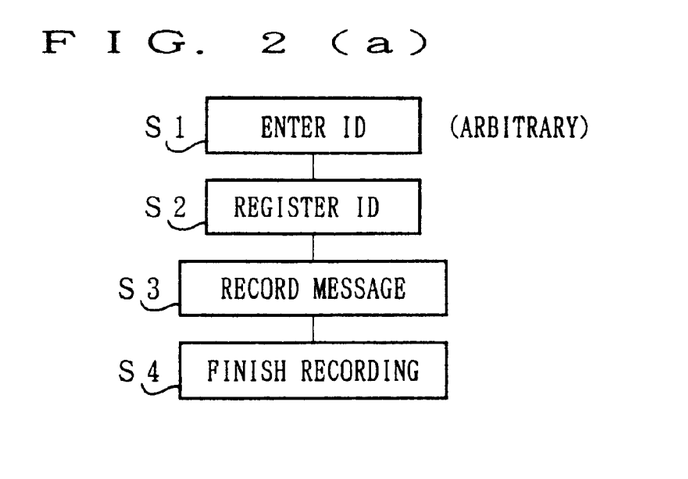
FIG. 2(a) and FIG. 2(b) are flowcharts respectively showing an operation of the answering system.

The following will describe one embodiment of the present invention referring to FIG. 1 and FIG. 2.

FIG. 1 is a block diagram showing a structure of an answering system 1 in accordance with one embodiment of the present invention. The answering system 1 of the present embodiment is provided in a phone having an answering function, and has an arrangement capable of receiving audio and/or visual data (hereinafter simply referred to as message) through a public line A.

The answering system 1 is provided with a sending-receiving unit 10, an ID detecting circuit 20, an ID register memory 30, a recording unit 40, a reproducing unit 50, a fixed response message generating unit 60, a personal message memory 70, an MPU section 80, a timer unit 90, an operation unit 100, an audio processing unit 110, a microphone 120, a speaker 130, a group message memory 140, an IDRAM 150, and a program ROM 160.

The operation section 100 is provided so as to allow an owner of the answering system 1 to register an identification code (hereinafter referred to as ID). An ID is registered by the owner through various keys provided on the operation section 100. The operation section 100 is also provided with a record key and a playback key for recording and reproducing of an answering message, respectively.

The sending-receiving unit 10 is connected to the public line A so as to (1) receive a message through the public line A and (2) send a message from the fixed response message generating unit 60 and other units through the public line A to a receiver.

The ID detecting circuit 20 detects an ID received by the sending-receiving unit 10, and the ID register memory 30 stores the ID detected by the ID detecting circuit 20. An arbitrary ID entered by an unspecified caller prior to entering a message is stored in the ID register memory 30.

The recording unit 40 records the entered message, and the reproducing unit 50 reproduces and outputs audio data from the fixed response message generating unit 60, personal message memory 70, and the group message memory 140.

The fixed response message generating unit 60 generates a fixed response message in response to receiving of a call or in accordance with the entered contents.

The personal message memory 70 stores a message entered by an unspecified caller with a personal ID (mentioned later). The personal message memory 70 also stores a phone number of the unspecified caller as entered by the unspecified caller.

Similarly, the group message memory 140 stores a message entered by an unspecified caller with a group ID (mentioned later). The group message memory 140 also stores a phone number as entered by the unspecified caller.

The timer unit 90 clocks time in the case where a timer (mentioned later) is set.

The speaker 130 is provided so as to allow the owner to listen to, for example, a message entered by a sender (unspecified caller).

The microphone 120 is provided so as to allow the owner to enter, for example, an answering message as audio data in response to listening to the message entered by the sender.

The audio processing unit 110 processes and outputs audio data (for example, response message of the owner) entered through the microphone 120.

The IDRAM 150 stores an ID such as a group ID which has been registered beforehand, and the program ROM 160 stores a program, etc., for setting of the timer (mentioned later).

The MPU section 80 is a processing section which controls the entire operation of the system, and has at least the following functions.

(1) judging whether the ID entered prior to entering of a message is a group ID or a personal ID.

(2) searching, in the case where the entered message is processed by the owner of the answering system 1, the phone number of the sender in the personal message memory 70 so as to reproduce from the reproducing unit 50 a message informing that the entered message has been processed by the owner, and send the message thus reproduced from the sending-receiving unit 10 to the public line A.

(3) confirming, in the case where the timer (mentioned later) is set, the contents of the program ROM 160 so as to operate the timer unit 90, and searching, in the case where the entered message is not processed by the owner in a predetermined period of time, the phone number of the sender in the personal message memory 70 so as to reproduce from the message reproducing unit 50 a message informing that the entered message has not been processed by the owner, and send the message thus reproduced from the sending-receiving unit 10 to the public line A.

(4) commanding the recording unit 40 to store in the personal message memory 70 the data (response message) which have been entered through the microphone 120 and processed in the audio processing unit 110.

(5) correcting or erasing the entered message in accordance with entry of keys.

The ID detecting circuit 20, the ID register memory 30, the personal message memory 70, and the MPU section 80 constitute confirming means.

The ID inputted by an unspecified caller through the line A is picked out at the ID detecting circuit 20 and is stored in the ID register memory 30 in the manner connected to the personal message memory 70 under the control of the MPU section 80. When such ID is again inputted, the MPU section 80 compares such ID with the IDs registered in both the ID register memory 30 and the IDRAM 150 and allows the unspecified caller to have access to the contents or information recorded in the personal message memory 70. Thus, these confirming means allow the unspecified caller to confirm whether audio and/or visual data sent by the unspecified caller have been processed by a receiver.

The recording of audio and/or visual data into the personal message memory 70 is carried out through signal conversion proceeding by the recording means 40, while the reproducing is carried out through reverse conversion proceeding of signal by the reproducing unit 50.

Note that, such confirming means allow the unspecified caller to confirm that the data recorded in the personal message memory 70 have been erased by having no response or some information.

The sending-receiving unit 10, the reproducing unit 50, the fixed response message generating unit 60, and the MPU section 80 constitute informing means.

In order to inform the unspecified caller that the audio and/or visual data have been processed by the receiver, the MPU section 80 activates the fixed response message generating unit 60 and orders to output a fixed message to the line A via the reproducing unit 50 and the sending-receiving unit 10 in accordance with an operation.

The sending-receiving unit 10, the fixed response message generating unit 60, the personal message memory 70, and the MPU section 80 constitute answering-back means.

In order to contact an address designated by the unspecified caller and inform the unspecified caller that the audio and/or visual data have been (or have not been) processed by the receiver, the MPU section 80 orders a dial generating section (not shown) provided in the sending-receiving unit 10 to dial a telephone number recorded in the personal message memory 70 by the unspecified caller, and orders the fixed response message generating unit 60 to send out the fixed message that the data have been (or have not been) processed by the receiver.

The ID detecting circuit 20, the ID register memory 30, the recording means 40, the personal message memory 70, and the MPU section 80 constitute correcting-erasing means.

When the unspecified caller again inputs the same ID as that inputted with a message, the MPU section 80 compares such ID with the IDs registered in both the ID register memory 30 and the IDRAM 150 and checks the identity. Upon this check, the MPU section 80 allows the unspecified caller to correct or erase only the audio and/or visual data at a concerned area in the personal message memory 70, provided that such data have not yet been processed by a receiver. The correcting or erasing process is carried out through the operation of the recording means 40 and the personal message memory 70 in accordance with the instructions inputted via the line A.

The ID detecting circuit 20, the ID register memory 30, the recording means 40, the personal message memory 70, and the MPU section 80 constitute erasing means.

In order to erase the audio and/or visual data after informing the unspecified caller that the data have been processed by the receiver, the MPU section 80 activates the recording means 40 and orders to overwrite invalid data onto the concerned area in the personal message memory 70.

The following will describe a registration method and priority orders of the following IDs: (a) an ID of the owner, (b) an arbitrary ID registered by an unspecified caller prior to entering of a message, and (c) a group ID registered beforehand for the members of a group.

In the method of registering the ID of the owner of the answering system 1, the ID is registered through the operation of the various keys of the operation section 100. For example, after an ID registration key is pressed, the keys of 1, 2, 3, and 4 are pressed, and by pressing again the ID registration key, registration is finished. The ID registered in this manner is given the first priority, and with this ID, all the messages can be processed.

An arbitrary ID registered for an unspecified caller is a temporary ID, and is effective only for the message entered by the unspecified caller. The arbitrary ID is entered by the unspecified caller by means of a tone signal (DTMF signal). The method of registering the arbitrary ID will be described later. Note that, there might be a case where the unspecified caller is entering a message as a member of a group using a group ID; however, by "arbitrary ID", it is meant a personal ID.

A group ID is registered by the owner of the answering system 1 through the operation section 100. For example, after pressing the ID registration key, the G key is pressed, followed by the keys of 5, 6, 7, and 8, and by pressing again the ID registration key, registration is finished. The group ID thus registered in this manner becomes available for members of a group with authorization of the owner. Also, the group ID thus registered beforehand is not a temporary ID, and therefore is stored in the IDRAM 150.

The priority orders of the described IDs used in the answering system 1 are as follows.

First Priority: The ID of the owner. This is the master ID of all the registered IDs.

Second Priority: A group ID. The group ID allows accessing to a message which has been group-registered (a message entered with a group ID).

Third Priority: An arbitrary ID registered by an unspecified caller. The arbitrary ID allows accessing to a message which has been personal-registered (a message entered with an arbitrary ID).

The following will describe the operation of the answering system 1 referring to FIG. 1 and FIG. 2.

The answering system 1 is set by the owner by pressing of the answering key provided on the operation section 100.

The following considers a case where an unspecified caller (hereinafter referred to as "X") sends a message to the owner of the answering system 1. First, "X" calls the owner. Here, since the answering mode is set, a pre-recorded voice is reproduced by the reproducing unit 50 from the fixed response message generating unit 60 so as to be sent to the public line A from the sending-receiving unit 10. Then, a s shown in FIG. 2(*a*) "X" enters an ID followed by a message in accordance with the pre-recorded voice.

For example, when "X" hears a voice "I cannot come to the phone right now, please enter your ID", "X" enters, in S1 of FIG. 2(*a*), a group ID if the message to be entered is a group message, or an arbitrary ID if the message to be entered is a personal message.

If the ID entered in S1 is a group ID, "X" hears a voice "Your message is going to be group-registered, please leave a message and press the # key when finished", and a message is entered accordingly. On the other hand, if the ID entered in S1 is an arbitrary ID, "X" hears a voice "please leave a message and press the # key when finished", and a message is entered accordingly. ID registration is carried out in this manner in S2, and upon entering of a message, the recording unit 40 carries out recording of the message in S3.

In the answering system 1, when entering of the message is finished, "X" hears a voice "Do you wish to set the timer? If yes, press 1, If no, press 2", and entry is made accordingly.

For example, when "yes" is selected, "X" hears a voice "Please set the time". If "X" needs a callback after 2 hours and 30 minutes, entry of 0, 2, 3, and 0 is made, and setting of time is finished with pressing of the # key. "X" then hears a voice "Please enter your phone number". When, for example, the phone number is 03-5432-1234, entry of 0, 3, 5, 4, 3, 2, 1, 2, 3, and 4 is made and the # key is pressed. In the case where the entered message is not processed by the set time, the answering system 1 automatically makes a call to the entered phone number after 2 hours and 30 minutes, and sends a fixed response message that "Your message has not been processed". Note that, the data of the entered phone number are stored in the personal message memory 70.

On the other hand, when the message entered by "X" is processed by the owner of the answering system 1 (hereinafter referred to as "Y"), the MPU section 80, in order to send a message informing that the message has been processed, immediately searches the phone number of "X" stored in the personal message memory 70 so as to send the message to the public line A from the sending-receiving unit 10 via the reproducing unit 50.

The following will describe again the case where an unspecified caller enters a message with a personal ID or a group ID. The ID entered in S1 of FIG. 2(*a*) is received by the sending-receiving unit 10, and is detected in the ID detecting circuit 20. The ID thus detected in the ID detecting circuit 20 is stored in the ID register memory 30 in S2, and it is judged in the MPU section 80 whether the entered ID is a group ID or a personal ID.

The entered message, after received by the sending-receiving unit 10, is processed in the recording unit 40, and in S3, stored in the group message memory 140 if the message is entered with a group ID or stored in the personal message memory 70 if the message is entered with a personal ID.

When the timer is set, a setting ID, for example, the key 1 is detected in the ID detecting circuit 20, and the MPU section 80 confirms the contents of the program ROM 160, and the timer unit 90 comes into operation. When the timer is set to 2 hours and 30 minutes, the timer counts the time for 2 hours and 30 minutes, and the MPU section 80 sends an output command to the reproducing unit 50. The reproducing unit 50, upon receiving the output command, calls for data of phone numbers from the personal message memory 70, and sends a predetermined message to the public line A via the sending-receiving unit 10.

When the message entered by "X" is stored in the personal message memory 70 or in the group message memory 140, "Y" can listen to the entered message not only from the speaker 130 through the operation of the playback key of the operation section 100 but also through the operation of a remote phone from outside. That is to say, when the owner of the answering system 1 makes a call to his/her answering system 1, the owner hears the fixed response message "I cannot come to the phone right now, please enter your ID". The message entered by "X" can be retrieved by entering the owner's ID followed by the # key.

When "Y", having listened to the entered message through operation of the playback key of the operation section 100, finishes listening to the message, "Y" hears a voice "Please enter a response message". In response to this, the recording key of the operation section 100 is pressed, and a response message is entered from the microphone 120, and with pressing of the # key, the MPU section 80 sends a command to the recording section 40 to store in the personal message memory 70 the data processed in the audio processing unit 110. In the case where the call is made from a remote location, the response message is entered through an operation of a remote phone, and the recording of the response message is finished with pressing the # key.

In the case where "X" calls "Y" again, and the message entered by "X" has been processed by "Y", and a response message has been recorded, when "X" enters an ID same as the one entered in the previous call, followed by the # key, "X" can listen to a message as recorded by "Y" after the fixed response message "You have a message". Also, it is possible to set the answering system 1 so that the message recorded by "X" can be erased after listening to the message.

In the case where a message is sent from "X" to "Y", and the message has not been processed by "Y", when "X" calls "Y" again, "X" hears a fixed response message "I cannot come to the phone right now, please enter your ID". Here, as shown in FIG. 2(b), when an ID the same as the one entered with the message in S5 is entered, it is judged in S6 whether the ID thus entered matches the one registered beforehand in the ID register memory 30.

If it is judged in S6 that the ID matches the one registered beforehand in the ID register memory 30, the sequence goes to S7, and a voice "Do you wish to correct the message or erase the message? Press 1 to correct, or press 2 to erase, and press the # key when finished" is reproduced in S7. In the case of correcting the message, the key 1 and the # key are pressed in S8, and a new message is entered in S9, and the # key is pressed to finish. As a result, in S10, the new message is stored in the personal message memory 70, replacing the old message.

In the case of erasing the message, the key 2 and the # key are pressed in S11. As a result, the old message is erased in S12, and the erasing operation is finished in S13.

Also, when a message is entered with a group ID, the group ID detected in the ID detecting circuit 20 is compared with an ID which has been registered beforehand as a group ID in the IDRAM 150. If the group ID detected in the ID detecting circuit 20 matches the registered ID, the message following the group ID is stored in the group message memory 140 by the recording unit 40.

When a person knowing the group ID with authorization of "Y" calls "Y" before "Y" processes the message, as above, a fixed response message "I cannot come to the phone right now, please enter your ID" is reproduced. Here, by entering the group ID followed by the # key, the message can be retrieved if the message is stored in the group message memory 140. When the message is finished, a fixed response message "Do you wish to correct the message or erase the message? Press 1 to correct, or press 2 to erase, and press the # key when finished" is reproduced. In the case of correcting the message, the key 1 and the # key are pressed, and by pressing the # key after entering a new message, the old message is replaced with the new message. In the case of erasing the message, the key 2 and the # key are pressed in S11 of FIG. 2 (b). In response to this, the MPU section 80 immediately erases the message in S12. Note that, the fixed response messages such as above are stored beforehand in the response fixed message generating unit 60.

Note that, the answering system 1 of the present embodiment is provided in a telephone having an answering function; however, the answering system of the present invention is not limited to this, but can also be provided in other devices such as a mobile communication terminal. Also, the answering system 1 of the present embodiment has an arrangement wherein audio and/or visual data are externally entered through the public line A. However, the answering system 1 of the present invention is not limited to this arrangement, but can adopt an arrangement wherein the audio and/or visual data are externally entered through a transmitting path such as a private line and an air interface, etc.

As described, the answering system 1 of the present invention capable of recording and reproducing audio and/or visual data includes confirming means for allowing an unspecified caller to confirm, using an arbitrary ID, whether audio and/or visual data sent with the arbitrary ID by the unspecified caller to the owner of the answering system have been processed by the owner.

Thus, with the confirming means, it is possible to confirm, using an arbitrary ID of an unspecified caller, whether a message as entered by the unspecified caller has been processed by the receiver.

It is preferable that the answering system of the present invention includes informing means for informing the unspecified caller by a pre-recorded voice, in the case where the audio and/or visual data entered with an arbitrary ID by the unspecified caller have been processed by the owner of the answering system, and it is confirmed by the unspecified caller with the confirming means using the arbitrary ID that the entered audio and/or visual data have been processed.

Thus, since it is possible to inform the unspecified caller by a prerecorded fixed response message whether the message has been processed or not, the unspecified caller is able to confirm that the message was indeed processed by the receiver, thereby improving the accuracy of information transmittance, and also allowing a visually handicapped person to confirm whether the message has been processed or not.

It is preferable that the answering system of the present invention includes answering-back means for automatically answering-back, in the case where the audio and/or visual data entered with an arbitrary ID by the unspecified caller have been processed by the owner of the answering system, the unspecified caller so as to inform that the entered audio and/or visual data have been processed by the owner.

Thus, when a message is processed and the answering system is set in an automatic response mode by the owner of the answering system, an automatic access is made by the answering-back means to the sender of the message, and a fixed response message is sent. Therefore, it is possible to automatically answer-back the sender so as to inform that the message was indeed processed by the owner, thereby greatly improving the accuracy of information transmittance and permitting an efficient use of information transmittance time.

It is preferable that the answering system of the present invention includes, as the confirming means, group confirming means for allowing, in the case where the audio and/or visual data entered with an arbitrary ID by the unspecified caller are group-registered, a registered member of a group to confirm, by entering of a group ID, whether the entered audio and/or visual data have been processed by the owner of the answering system.

Thus, since a group registration is carried out by setting of a group ID, even when a member of the group to whom the message is sent cannot be reached, whoever in the group obtained the message can confirm and respond to the message instead of the member to whom the message is sent, thereby widening the area in which information can be confirmed.

It is preferable that the answering system of the present invention includes answering-back means for automatically answering-back the unspecified caller after a certain period of time in the case where the audio and/or visual data entered with an arbitrary ID by the unspecified caller are not processed by the owner of the answering system in the certain period of time.

Thus, in the case where a response to the entered message is desired in a certain period of time, by setting of the time, it is possible to confirm with certainty whether the message was processed in the certain period of time.

It is preferable that the answering system of the present invention includes correcting means for correcting, by entering of an arbitrary ID, the audio and/or visual data which have been entered beforehand, in the case where the audio and/or visual data entered with the arbitrary ID by the unspecified caller have not been processed by the owner of the answering system.

Thus, in the case where it is realized, after the message is entered, that a mistake has been made, or in the case where it was found that the entered message does not need to be sent to the receiver anymore, if the message has not yet been processed by the receiver, by entering of an arbitrary ID, it is possible to correct or erase the message with ease by the correcting means, thereby preventing wrong information to be sent, and inconvenience for the receiver.

It is preferable that the answering system of the present invention includes erasing means for automatically erasing, in the case where the audio and/or visual data entered with an arbitrary ID by the unspecified caller have been processed by the owner of the answering system, the audio and/or visual data after a pre-recorded response message when an access is made again by the unspecified caller with the arbitrary ID.

Thus, in the case where the entered message has been processed indeed by the receiver, when the unspecified caller who entered the message make an access again by entering an ID the same as the one used when the message was entered, a fixed response message is reproduced, and the entered message is automatically erased. As a result, it is possible to confirm that the processed message has been erased, thereby permitting an efficient use of memory.

It is preferable that the answering system of the present invention includes the confirming means for allowing an unspecified caller to confirm, in the case where the audio and/or visual data entered with an arbitrary ID by the unspecified caller have been processed by the owner of the answering system and a response message is entered by the owner, the response message when the unspecified caller make an access again with the arbitrary ID.

Thus, in the case where the entered message is processed and a comment for the message is entered by the receiver, when an access is made again with the arbitrary ID, it is possible to listen to the comment, thereby permitting information to be confirmed anytime.

It is preferable that the answering system of the present invention includes correcting-erasing means for allowing, in the case where the audio and/or visual data entered with an arbitrary ID by the unspecified caller are group-registered, a registered member of a group to make an access with a group ID and to correct or erase the registered audio and/or visual data before the registered audio and/or visual data are processed by the owner of the answering system.

Thus, in the case where a message is entered by the unspecified caller with a group ID, and if the message has not been processed yet, it is possible for a member of the group to correct or erase the entered message using the group ID. Therefore, even when a wrong message has been sent with the group ID, or the message sent is not required anymore, by confirming the message, by the registered member of the group, before it is processed by a receiver to whom the message was sent, accurate information can be transmitted.

Namely, in the answering system of the present invention, it is possible, by the confirming means, to confirm whether a message entered by an unspecified caller has been processed using an arbitrary ID of the unspecified caller, and the result of the confirmation is informed by a pre-recorded fixed response message by the informing means, thereby improving (a) the accuracy of information transmittance and (b) schedule management greatly. Also, when a message from an unspecified caller is processed, an automatic answer-back is given by the answering-back means to the unspecified caller, thereby further improving the accuracy of information transmittance.

Further, since a group ID can be set so as to allow any member of a group to confirm or respond to the message, the area in which information can be confirmed can be widened. Also, since the answering-back means for automatically answering-back the unspecified caller after a certain period of time so as to send a response to the message entered by the unspecified caller is provided, it is possible for the unspecified caller to confirm whether the entered message was processed in a desired period of time.

Furthermore, in the case where the message entered by the unspecified caller has not been processed, when the unspecified caller make an access again, the message which was sent before can be corrected or erased. Namely, a mistake in the message can be corrected and new information can be added in the message, and also the message can be erased, increasing the chance to correct wrong information. Therefore, it is possible to prevent wrong information to be sent, and inconvenience for the receiver. Also, in the case where the message entered by the unspecified caller has been processed, when the unspecified caller make an access again, the message is automatically erased after a response message, thereby permitting an efficient use of memory.

Further, in the case where the entered message is processed and a comment for the message is entered by the receiver, when an access is made again, it is possible to listen to the comment by the confirming means, thereby permitting information to be confirmed anytime. Also, in the case where a message is entered with a group ID by the unspecified caller, if the entered message has not been processed yet, the message can be corrected or erased by any member of the group using the group ID, thereby improving the accuracy of information transmittance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An answering system for recording and reproducing audio or visual data transmitted from an unspecified caller through a line or other transmitting paths, comprising:

confirming means responsive to a call from the unspecified caller directly to an intended recipient of the transmitted audio or visual data for enabling the unspecified caller to confirm, using an arbitrary identification code, whether the transmitted audio or visual data have been processed by the intended recipient; and answering-back means for contacting, if the transmitted audio or visual data have been processed by the intended recipient, an address specified beforehand by the unspecified caller so as to inform the unspecified caller that the transmitted audio or visual data have been processed by the intended recipient.

2. An answering system for recording and reproducing audio or visual data transmitted from an unspecified caller through a line or other transmitting paths, comprising:

confirming means responsive to a call from the unspecified caller directly to an intended recipient of the transmitted audio or visual data for enabling the unspecified caller to confirm, using an arbitrary identification code, whether the transmitted audio or visual data have been processed by the intended recipient; and answering-back means for contacting, if the transmitted audio or visual data have not been processed by the intended recipient in a predetermined period of time or in a certain period of time as specified beforehand by the unspecified caller, an address specified beforehand by the unspecified caller so as to inform the unspecified caller that the transmitted audio or visual data have not been processed by the intended recipient.

3. An answering system for recording and reproducing audio or visual data transmitted from an unspecified caller through a line or other transmitting paths, comprising:

confirming means responsive to a call from the unspecified caller directly to an intended recipient of the transmitted audio or visual data for enabling the unspecified caller to confirm, using an arbitrary identification code, whether the transmitted audio or visual data have been processed by the intended recipient, wherein said confirming means sends, if a response message to the transmitted audio or visual data is provided, the response message to the unspecified caller when the unspecified caller confirms, using the identification code, whether or not the audio or visual data have been processed by the intended recipient.

4. An answering system having an answering mode for answering otherwise unanswered telephone calls placed directly to a called party, the answering system comprising:

a message playback and recording unit which plays a pre-recorded message in response to a first otherwise unanswered telephone call from a calling party directly to the called party and which records a calling party message which is responsive to the pre-recorded message;

a message memory which stores the recorded calling party message;

an ID memory which stores an ID associated with the recorded calling party message; and a processing unit responsive to a second otherwise unanswered telephone call from the calling party directly to the called party which enables the calling party to determine, using the ID associated with the recorded calling party message, whether the recorded calling party message has been processed by the called party, wherein the calling party message comprises visual data.

5. An answering system having an answering mode for answering otherwise unanswered telephone calls placed directly to a called party, the answering system comprising:

a message playback and recording unit which plays a pre-recorded message in response to a first otherwise unanswered telephone call from a calling party directly to the called party and which records a calling party message which is responsive to the pre-recorded message;

a message memory which stores the recorded calling party message;

an ID memory which stores an ID associated with the recorded calling party message; and a processing unit responsive to a second otherwise unanswered telephone call from the calling party directly to the called party which enables the calling party to determine, using the ID associated with the recorded calling party message, whether the recorded calling party message has been processed by the called party, wherein the calling party message comprises both audio and visual data.

6. An answering system having an answering mode for answering otherwise unanswered telephone calls placed directly to a called party, the answering system comprising:

a message playback and recording unit which plays a prerecorded message in response to a first otherwise unanswered telephone call from a calling party directly to the called party and which records a calling party message which is responsive to the prerecorded message;

a message memory which stores the recorded calling party message;

an ID memory which stores an ID associated with the recorded calling party message; and a processing unit responsive to a second otherwise unanswered telephone call from the calling party directly to the called party which enables the calling party to determine, using the ID associated with the recorded calling party message, whether the recorded calling party message has been processed by the called party, wherein the message memory further stores a calling party telephone number associated with the recorded calling party message.

7. The answering system as set forth in claim 6, wherein the processing unit automatically calls the calling party using the calling party telephone number to notify the calling party that the recorded calling party message has not been processed by the answering system within a specified period of time.

8. The answering system as set forth in claim 7, wherein the specified period of time is a calling-party-specified period of time.

9. An answering system having an answering mode for answering otherwise unanswered telephone calls placed directly to a called party, the answering system comprising:

a message playback and recording unit which plays a pre-recorded message in response to a first otherwise unanswered telephone call from a calling party directly to the called party and which records a calling party message which is responsive to the pre-recorded message;

a message memory which stores the recorded calling party message;

an ID memory which stores an ID associated with the recorded calling party message; and a processing unit responsive to a second otherwise unanswered telephone call from the calling party directly to the called party which enables the calling party to determine, using the ID associated with the recorded calling party message, whether the recorded calling party message has been processed by the called party, wherein the ID associated with the recorded calling party message is a group ID entered by the calling party and registered in advance by the called party.

10. An answering system having an answering mode for answering otherwise unanswered telephone calls placed directly to a called party, the answering system comprising:
- a message playback and recording unit which plays a pre-recorded message in response to a first otherwise unanswered telephone call from a calling party directly to the called party and which records a calling party message which is responsive to the pre-recorded message;
- a message memory which stores the recorded calling party message;
- an ID memory which stores an ID associated with the recorded calling party message; and
- a processing unit responsive to a second otherwise unanswered telephone call from the calling party directly to the called party which enables the calling party to determine, using the ID associated with the recorded calling party message, whether the recorded calling party message has been processed by the called party, wherein the answering system is provided in a telephone.

11. An answering system having an answering mode for answering otherwise unanswered telephone calls placed directly to a called party, the answering system comprising:
- a message playback and recording unit which plays a pre-recorded message in response to a first otherwise unanswered telephone call from a calling party directly to the called party and which records a calling party message which is responsive to the pre-recorded message;
- a message memory which stores the recorded calling party message;
- an ID memory which stores an ID associated with the recorded calling party message; and
- a processing unit responsive to a second otherwise unanswered telephone call from the calling party directly to the called party which enables the calling party to determine, using the ID associated with the recorded calling party message, whether the recorded calling party message has been processed by the called party, wherein the answering system is provided in a mobile telecommunication terminal.

* * * * *